United States Patent [19]

Tomi et al.

[11] Patent Number: 5,618,466
[45] Date of Patent: Apr. 8, 1997

[54] LIQUID CRYSTAL COMPOSITION AND A LIQUID CRYSTAL DISPLAY ELEMENT USING THE SAME

[75] Inventors: Yoshitaka Tomi; Etsuo Nakagawa; Shinichi Sawada, all of Chiba, Japan

[73] Assignee: Chisso Corporation, Osaka-fu, Japan

[21] Appl. No.: 523,916

[22] Filed: Sep. 6, 1995

[30] Foreign Application Priority Data

Sep. 6, 1994 [JP] Japan ................... 6-238554

[51] Int. Cl.⁶ .................. C09K 19/30; C09K 19/34; C09K 19/12; C09K 19/20
[52] U.S. Cl. ............... 252/299.63; 252/299.61; 252/299.66; 252/299.67
[58] Field of Search .............. 252/299.63, 299.66, 252/299.67, 299.61

[56] References Cited

U.S. PATENT DOCUMENTS

| | | | |
|---|---|---|---|
| 4,923,632 | 5/1990 | Sawada et al. | 252/299.61 |
| 5,032,313 | 7/1991 | Goto et al. | 252/299.63 |
| 5,156,763 | 10/1992 | Gray et al. | 252/299.67 |
| 5,308,538 | 5/1994 | Weber et al. | 252/299.61 |
| 5,344,587 | 9/1994 | Coates et al. | 252/299.66 |
| 5,378,395 | 1/1995 | Weber et al. | 252/299.63 |
| 5,387,369 | 2/1995 | Weber et al. | 252/299.01 |
| 5,453,864 | 9/1995 | Yamada et al. | 359/103 |
| 5,476,611 | 12/1995 | Nolan et al. | 252/299.01 |

*Primary Examiner*—Philip Tucker
*Attorney, Agent, or Firm*—Wenderoth, Lind & Ponack

[57] ABSTRACT

A liquid crystal composition used for a display element using TN (twisted nematic) mode or STN (super-twisted nematic) mode, having reduced threshold voltage and temperature dependency is provided, which composition is constituted by the following formulas (1) and (2):

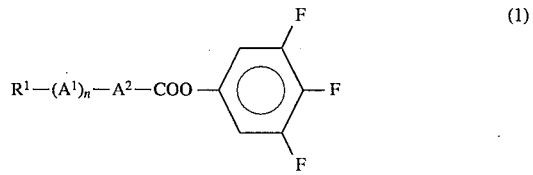

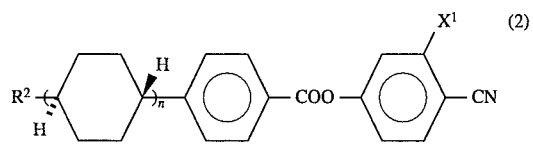

wherein
$R^1$ and $R^2$ are an alkyl group of 1 to 10C; $A^1$ and $A^2$ each independently are 1,4-cyclohexylene or 1,4-penylene;
n is 0 or 1; and X is H or F, and
when the liquid crystal composition of the present invention is used, it is possible to realize a liquid crystal display element superior in low voltage drive, low power consumption and contrast.

11 Claims, No Drawings

LIQUID CRYSTAL COMPOSITION AND A LIQUID CRYSTAL DISPLAY ELEMENT USING THE SAME

BACKGROUND OF THE INVENTION

1. Field of the Invention

This invention relates to a liquid crystal composition for liquid crystal display. More particularly, it relates to a liquid crystal composition used for a display element using TN (twisted nematic) mode or STN (super-twisted nematic) mode, and a liquid crystal display element using the same.

2. Description of the Related Art

Liquid crystal display element (LCD) utilizes the optical anisotropy and the dielectric anisotropy, and those utilizing nematic liquid crystalline phase among liquid crystal phases have been most often practically used. LCD makes possible, lower power consumption, smaller size and lighter weight, as compared with CRT (braun tube), etc.; hence it has begun to be used for handy type electronic calculator, digital watch, etc. and its application to word processor, television, meter panel for cars, etc. have also been broadened.

As liquid crystal substances expected as a material used for LCD, those exhibiting liquid crystal phases within a temperature range as broad as possible, around room temperature are desired, and they should be sufficiently stable to environmental factors used and have sufficient physical properties for driving display elements. At present, however, those satisfying these conditions as a single compound have not yet been found; hence several kinds of liquid crystal compounds are mixed or further a non-liquid crystal compound is mixed therewith to prepare liquid crystal compositions having various characteristics, and such compositions have been used as a material for LCD.

For example, as the characteristics of liquid crystal compositions sought for TN mode, the following ones have been required:

1) the nematic-isotropic phase transition point is high;
2) a suitable optical anisotropy can be taken depending upon the cell thickness of LCD; and in the case of STN mode, in addition to the above characteristics, it is required
3) the voltage-transmittance curve is steep.

An example of such liquid crystal compositions is a liquid crystal composition disclosed in Japanese patent application laid-open No. Hei 1-156392 wherein an LCD having a steep voltage-transmittance curve and a good contrast has been sought.

In recent years, energy-saving has been called for and demand for small type, light-weight, portable products such as electronic note-book, IC card, etc. has increased; hence as a development theme directed to LCD, low power consumption and low voltage driving have been mentioned. Further, it has raised an important problem to reduce an inferior display such as contrast insufficiency and cross-talk within a service temperature range. As the liquid crystal material, it has been required to reduce the threshold voltage in the electrooptical characteristic and reduce the temperature-dependency of the threshold voltage.

However, the liquid crystal composition disclosed in Japanese patent application laid-open No. Hei 1-156392 exhibits a high threshold voltage and an inferior temperature dependency of the threshold voltage; hence the liquid crystal composition is insufficient to be used for LCD of small type, light weight, portable product, etc., restricted in the driving electric source.

As described above, it is the present status that a product exhibiting a low threshold voltage and a superior temperature dependency of the threshold voltage has been earnestly desired.

SUMMARY OF THE INVENTION

Problem to be Solved by the Invention

The object of the present invention is to provide a liquid crystal composition having a low threshold voltage and having its temperature-dependency reduced, while satisfying various characteristics required for TN or STN.

The first aspect of the present invention has the following constitutions:

A liquid crystal composition which comprises
as a first component, at least one compound expressed by the formula (1)

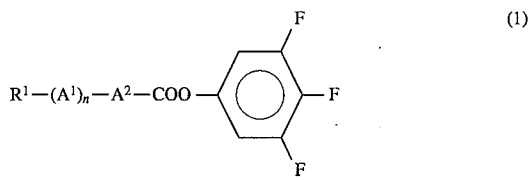

wherein $R^1$ represents an alkyl group of 1 to 10 carbon atoms and one —$CH_2$— group or two not-adjacent —$CH_2$— groups present in the alkyl group may be replaced by oxygen atom, —CO— group, —COO— group or —CH=CH— group; n represents 0 or 1; and $A^1$ and $A^2$ each independently represent trans-1,4-cyclohexylene or 1,4-phenylene, as a second component, at least one compound chosen from a group of compounds expressed by either one of the formulas (2) to (5):

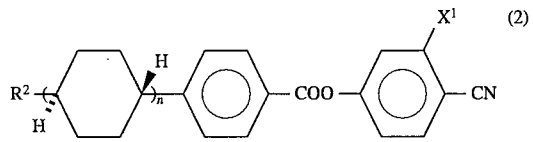

wherein $R^2$ represents an alkyl group of 1 to 10 carbon atoms and one —$CH_2$— group or two not-adjacent —$CH_2$— groups present in the alkyl group may be replaced by oxygen atom or —CH=CH— group; n represents 0 or 1; and $X^1$ represents H or F,

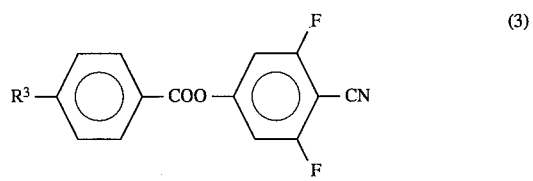

wherein $R^3$ represents a linear alkenyl group of 2 to 10 carbon atoms

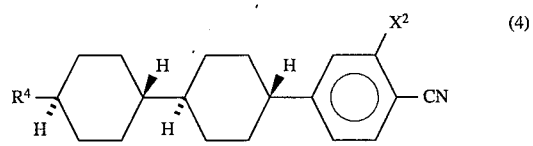

wherein $R^4$ represents a linear alkyl group of 1 to 10 carbon atoms; and $X^2$ represents H or F, and

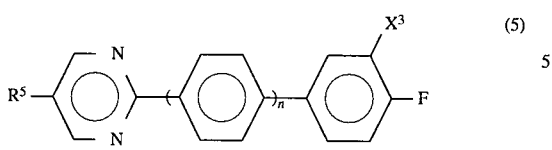

wherein $R^5$ represents an alkyl group of 1 to 10 carbon atoms; n represents 0 or 1; and $X^3$ represents H or F, and as a third component, at least one compound chosen from a group of compounds expressed by either one of the formulas (6) to (9):

wherein $R^6$ represents an alkyl group of 1 to 10 carbon atoms, and one —$CH_2$— group or two not-adjacent —$CH_2$— groups may be replaced by oxygen atom or —CH=CH— group; $A^3$ represents trans-1,4-cyclohexylene, 1,4-phenylene or

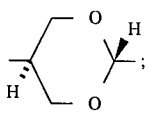

and $X^4$ represents H or F,

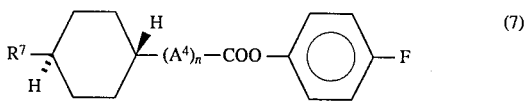

wherein $R^7$ represents a linear alkyl group of 1 to 10 carbon atoms; $A^4$ represents trans-1,4-cyclohexylene or 1,4-phenylene; and n represents 0 or 1, $$R^8-A^5-(A^6)_n-Z^1-A^7-R^9 \quad (8)$$

wherein $R^8$ and $R^9$ each independently represent an alkyl group of 1 to 10 carbon atoms and one —$CH_2$— group or two not-adjacent —$CH_2$— groups may be replaced by oxygen atom; $A^5$ and $A^6$ each independently represent 1,4-cyclohexylene or 1,4-phenylene, n represents 0 or 1; $Z^1$ represents —COO— or single bond; and $A^7$ represents trans-1,4-cyclohexylene, 1,4-phenylene or

wherein $R^{10}$ and $R^{11}$ each independently represent an alkyl group of 1 to 10 carbon atoms and one —$CH_2$— group or two not-adjacent —$CH_2$— groups may be replaced by oxygen atom; n represents 0 or 1; $A^8$ represents trans-1,4-cyclohexylene or

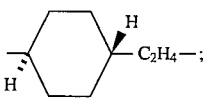

and $X^5$ represents H or F.

In the above liquid crystal composition of the first of the present invention, a preferable embodiment is as follows:

the proportion of the first component in the composition is 3 to 70% by weight; that of the second component is 3 to 70% by weight; and that of the third component is 3 to 70% by weight.

In the liquid crystal composition described in the first aspect of the present invention, when the compound constituting the first component expressed by the formula (1) is of the formula (1a)

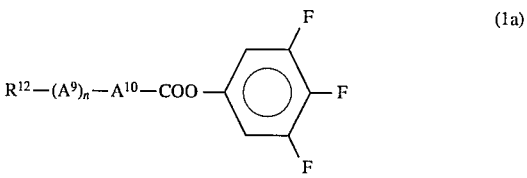

wherein $R^{12}$ represents a linear alkyl group of 1 to 10 carbon atoms; n represents 0 or 1; and $A^9$ and $A^{10}$ each independently represent trans-1,4-cyclohexylene or 1,4-phenylene, but when $A^9$ represents 1,4-phenylene, $A^{10}$ represents 1,4-phenylene), then the resulting liquid crystal composition is a preferable embodiment of the present invention.

In the liquid crystal composition described in the first aspect of the present invention, when the compound constituting the second component expressed by the formula (2), is of the following formula (2a), (2b) or (2c):

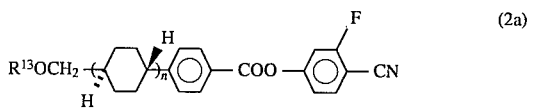

wherein $R^{13}$ represents a linear alkyl group of 1 to 10 carbon atoms and n represents 0 or 1,

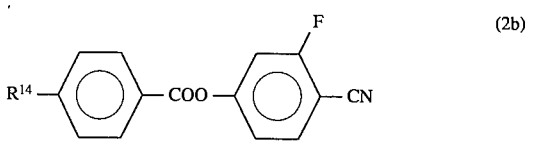

wherein $R^{14}$ represents a linear alkenyl group of 2 to 14 carbon atoms, and

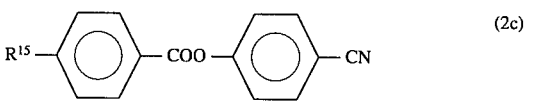

wherein $R^{15}$ represents a linear alkyl group of 1 to 10 carbon atoms, then the resulting liquid crystal composition is a preferable embodiment of the present invention. In the liquid crystal composition described in the first aspect of the present invention, when the compound expressed by the formula (5) is of the formula (5a)

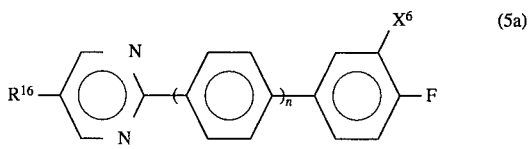

(5a)

wherein $R^{16}$ represents a linear alkyl group of 1 to 10 carbon atoms; n represents 0 or 1; and when n is 0, $X^6$ represents H or F, and when n is 1, $X^6$ represents H, then the resulting liquid crystal composition is a preferable embodiment of the present invention. In the liquid crystal composition described in the first aspect of the present invention, when the compound constituting the third component expressed by the formula (6) is of the following formula (6a) or (6b):

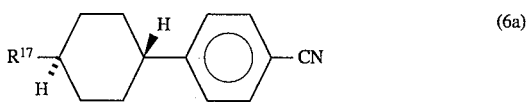

(6a)

wherein $R^{17}$ represents an alkoxymethyl group of 2 to 10 carbon atoms or an alkenyl group of 2 to 10 carbon atoms,

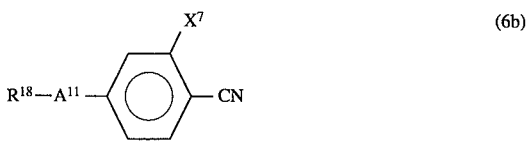

(6b)

wherein $R^{18}$ represents a linear alkyl group of 1 to 10 carbon atoms; $A^{11}$ represents a trans-1,4-cyclohexylene 1,4-phenylene or

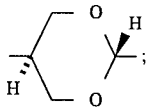

when $A^{11}$ is trans-1,4-cyclohexylene, $X^7$ is H or F, and when $A^{11}$ is 1,4-phenylene or

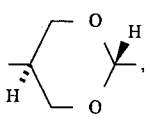

$A^7$ is H, then the resulting liquid crystal composition is a preferable embodiment of the present invention.

In the liquid crystal composition described in the first aspect of the present invention, when the compound constituting the third component expressed by the formula (8) is of the following formula (8a), (8b) or (8d):

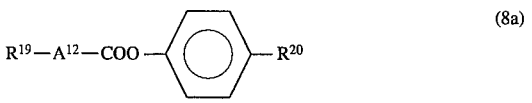

(8a)

wherein $A^{12}$ represents trans-1,4-cyclohexylene or 1,4-phenylene; when $A^{12}$ is trans-1,4-cyclohexylene, $R^{19}$ represents a linear alkyl group of 1 to 10 carbon atoms and when $A^{12}$ is 1,4-phenylene, $R^{19}$ represents a linear alkoxy group of 1 to 10 carbon atoms; when $A^{12}$ is trans-1,4-cyclohexylene, $R^{20}$ is a linear alkyl group or a linear alkoxy group of 1 to 10 carbon atoms and when $A^{12}$ is trans-1,4-cyclohexylene, $R^{20}$ represents a linear alkyl group or a linear alkoxy group of 1 to 10 carbon atoms, and when $A^{12}$ is 1,4-phenylene, $R^{20}$ is a linear alkyl group of 1 to 10 carbon atoms,

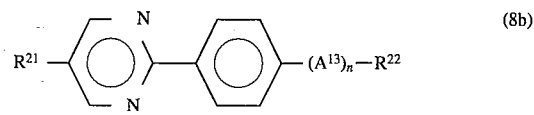

(8b)

wherein $R^{21}$ represents a linear alkyl group of 1 to 10 carbon atoms; $A^{13}$ represents trans-1,4-cyclohexylene or 1,4-phenylene; n represents 0 or 1; when n is 0, $R^{22}$ represents a linear alkyl group or a linear alkoxy group of 1 to 10 carbon atoms and when n is 1, $R^{22}$ is a linear alkyl group of 1 to 10 carbon atoms,

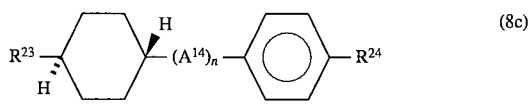

(8c)

wherein $R^{23}$ represents a linear alkyl group of 1 to 10 carbon atoms; $A^{14}$ represents trans-1,4-cyclohexylene or 1,4-phenylene; n represents 0 or 1; when n is 0, $R^{24}$ is a linear alkoxy group of 1 to 10 carbon atoms, and when n is 1 and $A^{14}$ is trans-1,4-cyclohexylene, $R^{24}$ is a linear alkyl group or a linear alkoxy group of 1 to 10 carbon atoms, and when n is 1 and $A^{14}$ is 1,4-phenylene, $R^{24}$ is a linear alkyl group of 1 to 10 carbon atoms,

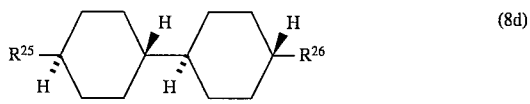

(8d)

wherein $R^{25}$ represents a linear alkyl group of 1 to 10 carbon atoms; and $R^{26}$ represents a linear alkyl group of 1 to 10 carbon atoms or a linear alkoxy group of 2 to 10 carbon atoms, then the resulting liquid crystal composition is a preferable embodiment of the present invention.

In the liquid crystal composition described in the first aspect of the present invention, when the compound constituting the third component expressed by the formula (9) is of the following formula (9a) or (9b).

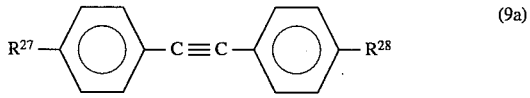

(9a)

wherein $R^{27}$ represents a linear alkyl group of 1 to 10 carbon atoms; and $R^{28}$ represents a linear alkyl group or a linear alkoxy group of 1 to 10 carbon atoms,

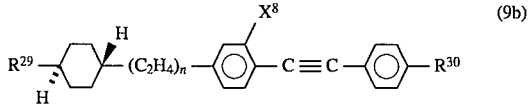

(9b)

wherein $R^{29}$ and $R^{30}$ each independently represent a linear alkyl group of 1 to 10 carbon atoms; n represents 0 or 1; when n is a 0, $X^8$ is F, and when n is 1, $X^8$ is H, then the resulting liquid crystal composition is preferable embodiment of the present invention.

The second aspect of the present invention is directed to an electrooptical display element characterized by using the liquid crystal composition described in the first aspect of the present invention.

As the compounds expressed by the formula (1) constituting the first component of the liquid crystal composition of the present invention, compounds expressed by the following formulas (1-1) to (1-6) are particularly preferable.

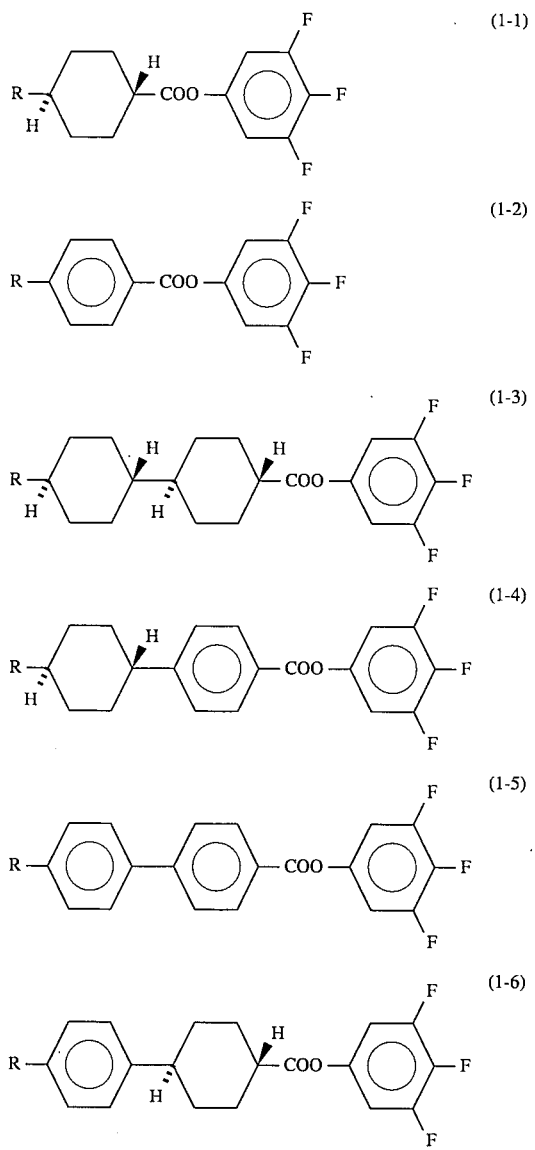

In these formulas, R represents a linear alkyl group of 1 to 10 carbon atoms.

In the liquid crystal composition of the present invention, the compounds expressed by the formula (1) are particularly effective for reducing the threshold voltage and its temperature dependency, and the preferable proportion of the first component consisting of these compounds in the composition is 3 to 70% by weight, particularly 3 to 50% by weight.

As the compounds constituting the second component of the liquid crystal composition and expressed by the formula (2), those expressed by the following formulas (2-1) to (2-5) are particularly preferable:

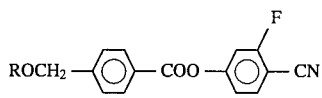

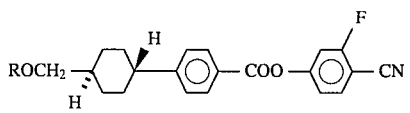

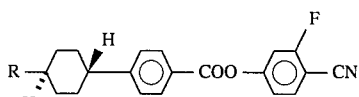

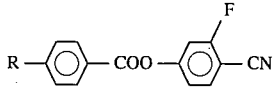

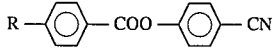

In these formulas, R represents a linear alkyl group of 1 to 10 carbon atoms or a linear alkenyl group of 2 to 10 carbon atoms.

In the liquid crystal composition of the invention, as compounds expressed by the formula (2) have CN group at the terminal, they have a high elastic constant ratio, $K_3/K_1$. Thus they are useful for improving steepness for STN, and/or useful as a material for adjusting the threshold voltage. Herein, $K_1$ and $K_3$ respectively refer to splay and bending elastic constant by way of Frank.

As compounds constituting the second component expressed by the formula (3), those expressed by the formula (3-1)

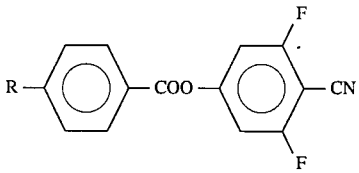

wherein R represents a linear alkenyl group of 2 to 10 carbon atoms are particularly preferable.

In the liquid crystal composition of the present invention, the compounds expressed by the formula (3) are effective as a material for adjusting the threshold voltage, and for STN, as they have CN group at the terminal, they have a high elastic constant ratio, $K_3/K_1$ so that they are useful for improving the steepness.

As the compounds expressed by the formula (4) constituting the second component of the liquid crystal composition of the present invention, those expressed by the following formulas (4-1) or (4-2) are particularly preferable:

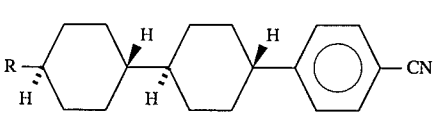

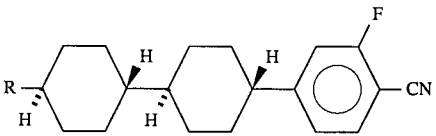

In these formulas, R represents a linear alkyl group of to 10 carbon atoms.

In the liquid crystal composition of the present invention, the compounds expressed by the formula (4) are particularly useful as a material for adjusting the threshold voltage or for raising the clearing point.

As the compounds expressed by the formula (5) constituting the second component of the liquid crystal composition of the present invention, those expressed by the following formulas (5-1) to (5-4) are particularly preferable:

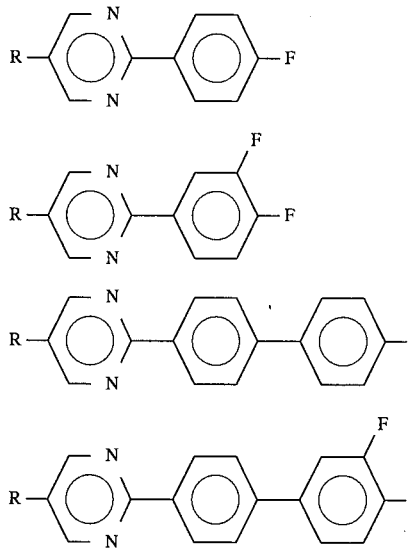

In these formulas, R represents a linear alkyl group of 1 to 10 carbon atoms.

In the liquid crystal composition of the present invention, the compounds expressed by the formula (5) are effective for reducing the threshold voltage.

In the liquid crystal composition of the present invention, the preferable proportion of the second component in the composition is 3 to 70% by weight, particularly 3 to 50% by weight.

As the compounds expressed by the formula (6) constituting the third component of the liquid crystal composition of the present invention, those expressed by the following formulas (6-1) to (6-5) are particularly preferable:

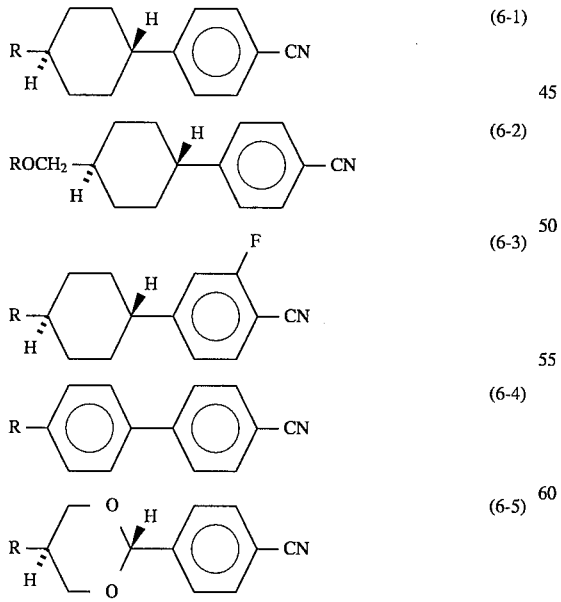

In these formulas, R represents a linear alkyl group of 1 to 10 carbon atoms or a linear alkenyl group of 2 to 10 carbon atoms.

As the compounds expressed by the formula (7) constituting the third component of the liquid crystal composition of the present invention, those expressed by the following formulas (7-1) to (7-3) are particularly preferable:

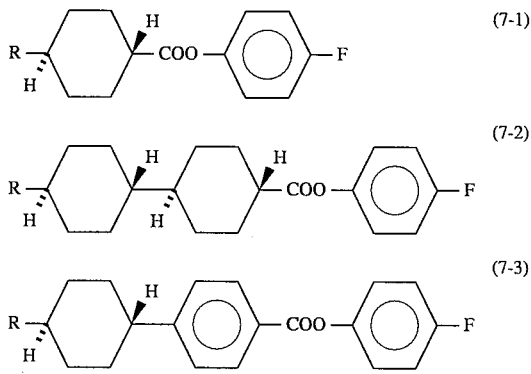

In these formulas, R represent a linear alkyl group of 1 to 10 carbon atoms.

The compounds expressed by the formulas (6) and (7) in the liquid crystal composition of the present invention are useful for adjusting the threshold voltage and the clearing point.

As the compounds expressed by the formula (8) constituting the third component of the liquid crystal composition of the present invention, those expressed by the following formulas (8-1) to (8-16) are particularly preferable:

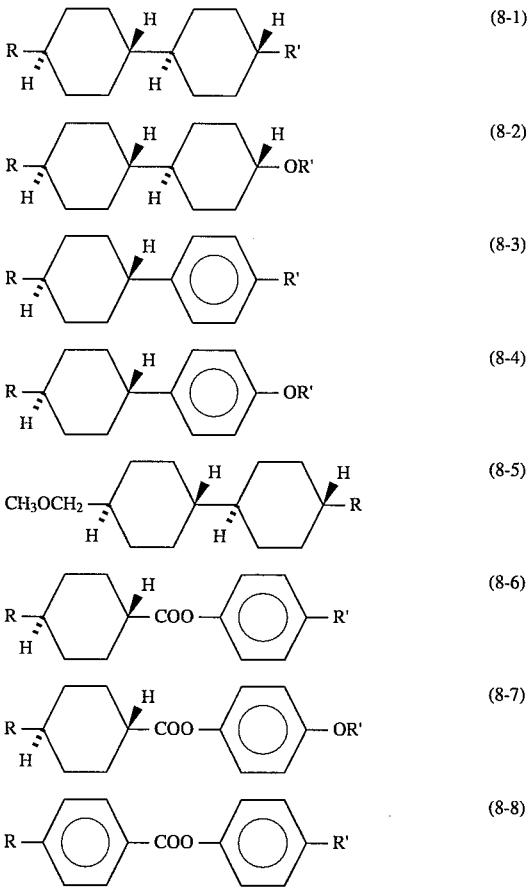

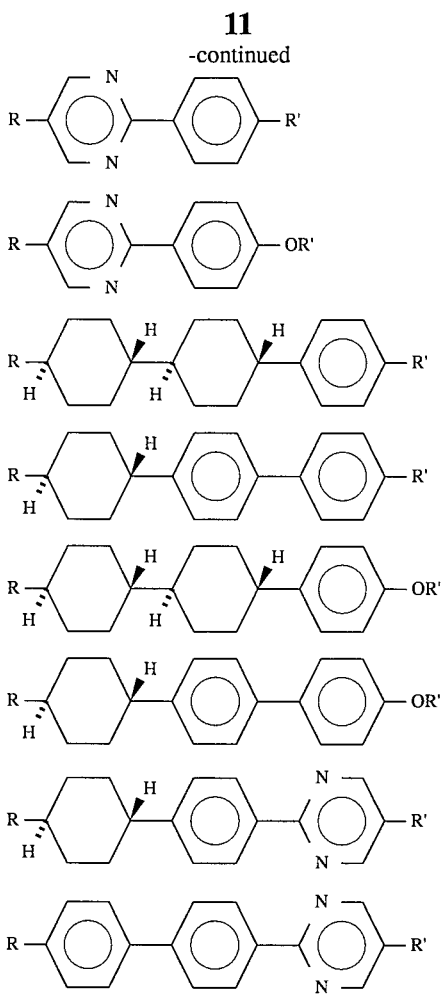

In these formulas, R and R' each independently represent a linear alkyl group of 1 to 10 carbon atoms.

As the compounds expressed by the formula (9) constituting the third component of the liquid crystal composition of the present invention, those expressed by the following formulas (9-1) to (9-5) are particularly preferable:

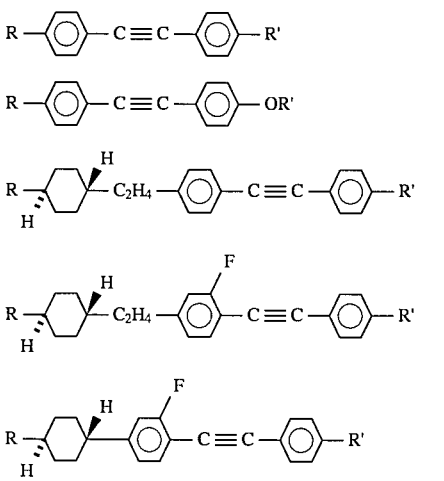

In these formulas, R and R' each independently represent a linear alkyl group of 1 to 10 carbon atoms.

The compounds expressed by the formulas (8) and (9) in the liquid crystal composition of the present invention are effective as a material for adjusting the clearing point, optical anisotropy or viscosity.

In the liquid crystal composition of the present invention, the preferable proportion of the third component in the composition is in the range of 3 to 70% by weight.

The liquid crystal composition may also contain one or more compounds besides the above compounds expressed by the formulas (1) to (9), depending upon the object of liquid crystal display element used, and within a range in which the object of the present invention is not obstructed. As examples of preferable compounds among them, compounds expressed by the following formulas (10) to (31) are mentioned:

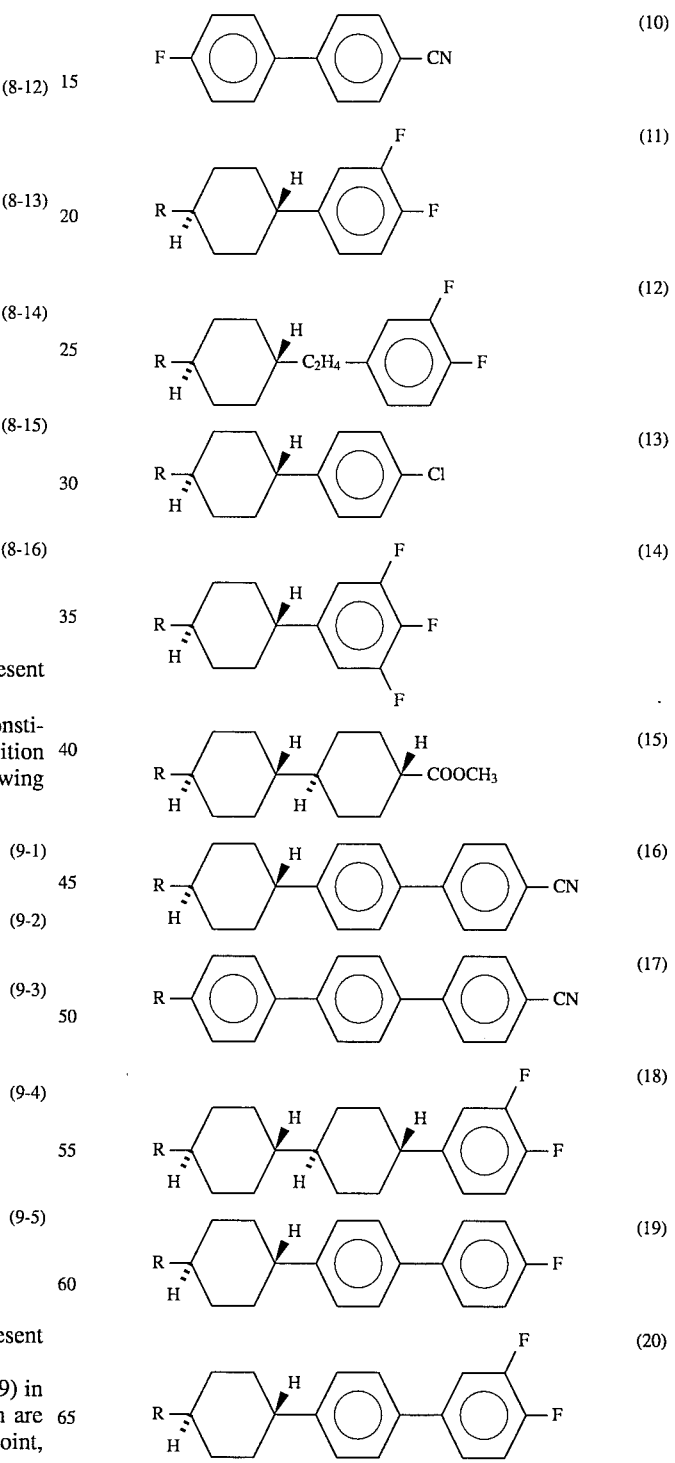

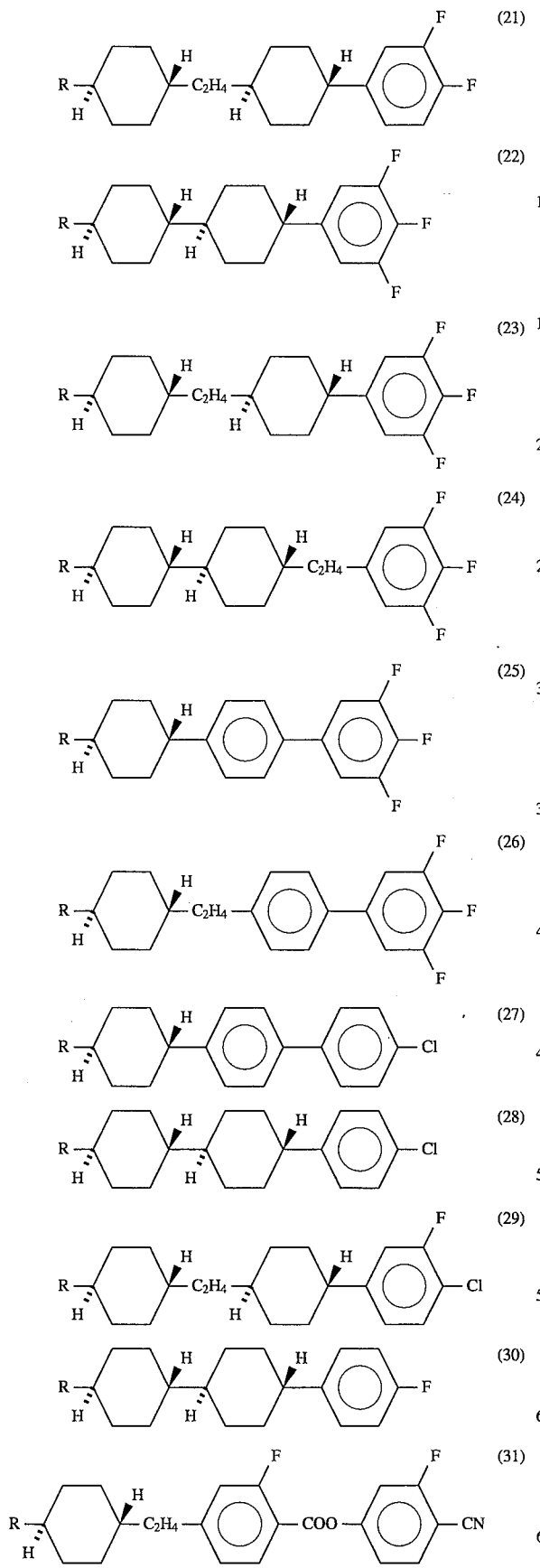

In these formulas, R represents a linear alkyl group of 1 to 10 carbon atoms.

Next, preferable embodiments of the present invention will be more concretely shown below.

A liquid crystal composition characterized by containing 3 to 50% by weight of a first component containing at least one compound chosen from among a group of compounds expressed by the above formula (1a);

3 to 50% by weight of a second component containing at least one compound chosen from among a group of compounds expressed by the above formula (3); and 3 to 70% by weight of a third component containing at least one compound chosen from among a group of compounds expressed by the above formula (6), at least one compound chosen from among a group of compounds expressed by the above formula (7) and at least one compound chosen from among a group of compounds expressed by the formula (8).

A liquid crystal composition characterized by containing 3 to 50% by weight of a first component containing at least one compound chosen from among a group of compounds expressed by the above formula (1a);

3 to 50% by weight of a second component containing at least one compound chosen from among a group of compounds expressed by the above formula (2), at least one compound chosen from among a group of compounds expressed by the above formula (4) and at least one compound chosen from among a group of compounds expressed by the formula (5); and 3 to 70% by weight of a third component containing at least one compound chosen from among a group of compounds expressed by the formula (6), at least one compound chosen from among a group of compounds expressed by the formula (7) and at least one compound chosen from among a group of compounds expressed by the formula (8).

A liquid crystal composition characterized by containing 3 to 50% by weight of a first component containing at least one compound chosen from among a group of compounds expressed by the formula (1a);

3 to 50% by weight of a second component containing at least one compound chosen from among a group of compounds expressed by the formula (2), and at least one compound chosen from a group of compounds expressed by the formula (5);

3 to 70% by weight of a third component containing at least one compound chosen from among a group of compounds expressed by the formula (9).

A liquid crystal composition characterized by containing 3 to 50% by weight of a first component containing at least one compound chosen from among a group of compounds expressed by the above formula (1a);

3 to 50% by weight of a second component containing at least one compound chosen from among a group of compounds expressed by the above formula (2); and 3 to 70% by weight of a third component containing at least one compound chosen from among a group of compounds expressed by the above formula (6) and at least one compound chosen from among a group of compounds expressed by the above formula (8).

A liquid crystal composition characterized by containing 3 to 50% by weight of a first component containing at least one compound chosen from among a group of compounds expressed by the above formula (1a);

3 to 50% by weight of a second component containing at least one compound chosen from among a group of compounds expressed by the above formula (2), at least one compound chosen from among a group of compounds expressed by the above formula (4), and at least one compound chosen from among a group of compounds expressed by the above formula (5); and 3 to 70% by weight of a third component containing at least one compound chosen from among a group of compounds expressed by the above formula (6), at least one compound chosen from among a group of compounds expressed by the above formula (8), and at least one compound chosen from among a group of compounds expressed by the above formula (9).

A liquid crystal composition characterized by containing 3 to 50% by weight of a first component containing at least one compound chosen from among a group of compounds expressed by the above formula (1a);

3 to 50% by weight of a second component containing at least one compound chosen from among a group of compounds expressed by the above formula (2) and at least one compound chosen from among a group of compounds expressed by the above formula (4); and 3 to 70% by weight of a third component containing at least one compound chosen from among a group of compounds expressed by the above formula (6), at least one compound chosen from among a group of compounds expressed by the above formula (7) and at least one compound chosen from among a group of compounds expressed by the above formula (8).

Further, the preferable embodiments of the second component constituting the liquid crystal composition of the present invention are as follows:

a case where it consists of at least one compound chosen from among a group of compounds expressed by the above formula (2).

A case where it consists of at least one compound chosen from among a group of compounds expressed by the formula (3).

A case where it consists of at least one compound chosen from among a group of compounds expressed by the formula (4).

A case where it consists of at least one compound chosen from among a group of compounds expressed by the formula (5).

A case where it consists of at least one compound chosen from among a group of compounds expressed by the formula (2) and at least one compound chosen from among a group of compounds expressed by the formula (3).

A case where it consists of at least one compound chosen from among a group of compounds expressed by the formula (2) and at least one compound chosen from among a group of compound expressed by the formula (4).

A case where it consists of at least one compound chosen from among a group of compounds expressed by the formula (2) and at least one compound chosen from among a group of compounds expressed by the formula (5).

A case where it consists of at least one compound chosen from among a group of compounds expressed by the formula (3) and at least one compound chosen from among a group of compound expressed by the formula (4).

A case where it consists of at least one compound chosen from among a group of compounds expressed by the formula (3) and at least one compound chosen from among a group of compounds expressed by the formula (5).

A case where it consists of at least one compound chosen from among a group of compounds expressed by the formula (4) and at least one compound chosen from among a group of compounds expressed by the formula (5).

The preferable embodiments constituting the third component of the liquid crystal composition of the present invention are as follows:

A case where it consists of at least one compound chosen from among a group of compounds expressed by the formula (6).

A case where it consists of at least one compound chosen from among a group of compounds expressed by the formula (7).

A case where it consists of at least one compound chosen from among a group of compounds expressed by the formula (8).

A case where it consists of at least one compound chosen from among a group of compounds expressed by the formula (9).

A case where it consists of at least one compound chosen from among a group of compounds expressed by the formula (6) and at least one compound chosen from among a group of compounds expressed by the formula (7).

A case where it consists of at least one compound chosen from among a group of compounds expressed by the formula (6) and at least one compound chosen from among a group of compounds expressed by the formula (8).

A case where it consists of at least one compound chosen from among a group of compounds expressed by the formula (6) and at least one compound chosen from among a group of compounds expressed by the formula (9).

A case where it consists of at least one compound chosen from among a group of compounds expressed by the formula (7) and at least one compound chosen from among a group of compounds expressed by the formula (8).

A case where it consists of at least one compound chosen from among a group of compounds expressed by the formula (7) and at least one compound chosen from among a group of compounds expressed by the formula (9).

A case where it consists of at least one compound chosen from among a group of compounds expressed by the formula (8) and at least one compound chosen from among a group of compounds expressed by the formula (9).

A case where it consists of at least one compound chosen from among a group of compounds expressed by the formula (6), at least one compound chosen from among a group of compounds expressed by the formula (7) and at least one compound chosen from among a group of compounds expressed by the formula (8).

A case where it consists of at least one compound chosen from among a group of compound expressed by the formula (6), at least one compound chosen from among a group of compounds expressed by the formula (7) and at least one compound chosen from among a group of compounds expressed by the formula (9).

A case where it consists of at least one compound chosen from among a group of compounds expressed by the formula (6), at least one compound chosen from among a group of compounds expressed by the formula (8), and at least one compound chosen from among a group of compound expressed by the formula (9).

A case where it consists of at least one compound chosen from among a group of compounds expressed by the formula (7), at least one compound chosen from among a group of compounds expressed by the formula (8), and at least one compound chosen from among a group of compounds expressed by the formula (9).

A case where it consists of at least one compound chosen from among a group of compounds expressed by the formula (6), at least one compound chosen from among a group of compounds expressed by the formula (7), at least one compound chosen from among a group of compounds expressed by the formula (8) and at least one compound chosen from among a group of compounds expressed by the formula (9).

A chiral dopant may be added to the liquid crystal composition in order to induce a helical structure of liquid crystal to adjust a necessary twist angle and prevent a reverse twist. The liquid crystal composition of the present invention can be prepared according to a method of dissolving various components with each other at a high temperature.

Further, to the liquid crystal composition of the present invention may be added a dichroic dyestuff such as those of mellocyanine group, styryl group, azo group, azomethine group, azoxy group, quinophthalone group, anthraquinone group, tetrazine group, etc. and the mixture may be used as a liquid crystal composition for guest-host (GH) mode. Further, the liquid crystal composition of the present invention may be used as those for polymer dispersion type liquid crystal display element (PDLCD) represented by NCAP prepared by micro-capsulating a nematic liquid crystal or a polymer net-work liquid crystal display element (PNLCD) prepared by forming a three-dimensional reticulated, high molecule. Besides, the composition may also be used as those for birefringence-controlling (ECB) mode or dynamic scattering (DS) mode.

EXAMPLE

The present invention will be described in more detail by way of Examples and Comparative examples. But, it should not be construed to be limited thereto.

In Comparative examples and Examples, the measured temperature of the threshold voltage is 25.0° C. that of the viscosity is 20.0° C. and that of the optical anisotropy is 25.0° C., and the measurement wavelength of the optical anisotropy is 589 nm. Further, the composition ratios in Comparative examples and Examples are all by weight %. The temperature-dependency of the threshold voltage $\delta$ is defined by the following equation:

$$\delta = \frac{V_{10}(20° C.) - V_{10}(40° C.)}{40° C. - 20° C.} \quad (V/°C.)$$

This equation means that the less the $\delta$, the more reduced the temperature-dependency of the threshold voltage.

Comparative Example 1

A liquid crystal composition having the following composition was prepared:

| | |
|---|---|
| 4-(trans-4-propylcyclohexyl)benzonitrile | 24% |
| 4-(trans-4-pentylcyclohexyl)benzonitrile | 36% |
| 4-(trans-4-heptylcyclohexyl)benzonitrile | 25% |
| 4-[4-(trans-4-pentylcyclohexyl)phenyl]benzonitrile | 15% |

This liquid crystal composition exhibited a clearing point of 72.4° C.; a viscosity of 27.0 mPa.s; an optical anisotropy of 0.137; a threshold voltage of 1.78 V; and a $\delta$ of 0.013 V/°C.

Comparative Example 2

The following composition disclosed in Japanese patent application laid-open No. Hei 1-156392 was prepared:

| | |
|---|---|
| 4-[trans-4-(3-butenyl)cyclohexyl]benzonitrile | 10% |
| 4-[trans-4-(trans-3-pentenyl)cyclohexyl]benzonitrile | 10% |
| 4-[trans-4-(trans-4-ethylcyclohexyl)cyclohexyl]-benzonitrile | 5% |
| 4-[trans-4-(trans-4-propylcyclohexyl)cyclohexyl]-benzonitrile | 5% |
| 4-[trans-4-(trans-4-ethylcyclohexyl)cyclohexyl]-1,2-difluorobenzene | 10% |
| 4-[trans-4-(trans-4-propylcyclohexyl)cyclohexyl]-1,2-difluorobenzene | 10% |
| 4-[trans-4-(trans-4-propylcyclohexyl)cyclohexyl]anisole | 4% |
| 4-[trans-4-(trans-4-propylcyclohexyl)cyclohexyl]-1-fluorobenzene | 4% |
| 4-[trans-4-(trans-4-propylcyclohexyl)cyclohexyl]toluene | 6% |
| 4-[trans-4-(trans-4-propylcyclohexyl)cyclohexyl]-1-propylbenzene | 6% |
| 4-ethyl-4'-methyltolan | 5% |
| 4,4'-dibutyltolan | 5% |
| 4-hexyl-4'-methyltolan | 5% |
| 4-(trans-4-propylcyclohexyl)-2-fluorobenzonitrile | 14% |

This composition exhibited a clearing point of 90.2° C., a viscosity of 22.2 mPa·s, an optical anisotropy of 0.013, a threshold voltage of 1.99 V and a $\delta$ of 0.014 V/°C.

Example 1

A liquid crystal composition was prepared, which consisted of

| | |
|---|---|
| as compounds expressed by the formula (1), | |
| 3,4,5-trifluorophenyl-4-(trans-4-ethylcyclohexyl)benzoate | 7% |
| 3,4,5-trifluorophenyl-4-(trans-4-propylcyclohexyl)-benzoate | 7% |
| 3,4,5-trifluorophenyl-4-(trans-4-pentylcyclohexyl)-benzoate | 7% |
| 3,4,5-trifluorophenyl-trans-4-(trans-4-pentylcyclohexyl)-cyclohexanecarboxylate | 15% |
| as a compound expressed by the formula (3), | |
| 3,5-difluoro-4-cyanophenyl-4-(trans-3-pentenyl)benzoate | 10%, |
| as compounds expressed by the formula (6), | |
| 4-(trans-4-ethylcyclohexyl)-2-fluorobenzonitrile | 15% |
| 4-(trans-4-propylcyclohexyl)-2-fluorobenzonitrile | 15%, |
| as compounds expressed by the formula (7), | |
| 4-fluorophenyl-trans-4-(trans-4-propylcyclohexyl)-cyclohexanecarboxylate | 6% |
| 4-fluorophenyl-trans-4-(trans-4-pentylcyclohexyl)-cyclohexanecarboxylate | 6% |
| and as compounds expressed by the formula (8), | |
| 4-[trans-4-(trans-4-propylcyclohexyl)cyclohexyl]toluene | 8% |
| 4-[trans-4-(trans-4-propylcyclohexyl)cyclohexyl]anisole | 4% |

This composition exhibited a clearing point of 69.1° C., a viscosity of 40.2 mPa·s, an optical anisotropy of 0.097, a threshold voltage of 0.87 V and a $\delta$ of 0.003 V/°C.

As compared with the compositions of Comparative exmaples 1 and 2, the threshold voltage lowered and the temperature characteristic of the threshold voltage was reduced.

Example 2

A liquid crystal composition was prepared, which consisted of

| | |
|---|---|
| as compounds expressed by the formula (1), | |
| 3,4,5-trifluorophenyl-4-(trans-4-ethylcyclohexyl)-benzoate | 5%, |

-continued

| | |
|---|---|
| 3,4,5-trifluorophenyl-4-(trans-4-propylcyclohexyl)-benzoate | 5% |
| as compounds expressed by the formula (2), | |
| 3-fluoro-4-cyanophenyl-4-[trans-4-(propyloxymethyl)-cyclohexyl]benzoate | 8% |
| 3-fluoro-4-cyanophenyl-4-(trans-3-pentenyl)benzoate | 8%, |
| as a compound expressed by the formula (4), | |
| 4-[trans-4-(trans-4-propylcyclohexyl)cyclohexyl]benzonitrile | 8%, |
| as a compound expressed by the formula (5), | |
| 2-(3,4-difluorophenyl)-5-propylpyrimidine | 4%, |
| as compounds expressed by the formula (6), | |
| 4'-ethyl-4-cyanobiphenyl | 4%, |
| 4-(trans-4-propylcyclohexyl)benzonitrile | 4%, |
| as a compound expressed by the formula (7), | |
| 4-fluorophenyl-4-(trans-4-propylcyclohexyl)benzoate | 4%, |
| and as compounds expressed by the formula (8), | |
| trans-4-(trans-4-propylcyclohexyl)-1-methoxymethyl-cyclohexane | 8%, |
| trans-4-(trans-4-propylcyclohexyl)-1-butylcyclohexane | 6%, |
| 4-[trans-4-(trans-4-ethylcyclohexyl)cyclohexyl]toluene | 8%, |
| 4-[trans-4-(trans-4-propylcyclohexyl)cyclohexyl)]toluene | 8%, |
| 4-[trans-4-(trans-4-propylcyclohexyl)cyclohexyl)]anisole | 5%, |
| 1-[trans-4-(trans-4-propylcyclohexyl)cyclohexyl)-4-propylbenzene | 15% |

This composition exhibited a clearing point of 103.2° C., a viscosity of 27.1 mPa·s, an optical index of 0.119, a threshold voltage of 1.55 V and a δ of 0.005 V/°C.

As compared with compositions of Comparative examples 1 and 2, this composition exhibited a lower threshold voltage and a reduced temperature characteristic of the threshold voltage.

Example 3

A liquid crystal composition was prepared, which consisted of:

| | |
|---|---|
| As a compound expressed by the formula (1) | |
| 3,4,5-trifluorophenyl-trans-4-(trans-4-pentylcyclohexyl)cyclohexanecarboxylate | 10%, |
| as compounds expressed by the formula (2), | |
| 3-fluoro-4-cyanophenyl-4-(propyloxymethyl)benzoate | 13%, |
| 4-cyanophenyl-4-ethylbenzoate | 5%, |
| 3-fluoro-4-cyanophenyl-4-[trans-4-(pentyloxymethyl)-cyclohexyl]benzoate | 6%, |
| as a compound expressed by the formula (5), | |
| 2-(4-fluorobiphenyl-4'-yl)-5-propylpyrimidine | 3%, |
| and as compounds expressed by the formula (9), | |
| 4-ethyl-4'-methyltolan | 8%, |
| 4-hexyl-4'-methyltolan | 16%, |
| 4,4'-dibutyltolan | 8%, |
| 4-ethyl-4'-methoxytolan | 11%, |
| 4-(trans-4-propylcyclohexyl)-2-fluoro-4'-ethyltolan | 5%, |
| 4-(trans-4-propylcyclohexyl)-2-fluoro-4'-propyltolan | 5%, |
| 4-[2-(trans-4-propylcyclohexyl)ethyl]-4'-ethyltolan | 5%, |
| 4-[2-(trans-4-propylcyclohexyl)ethyl]-4'-propyltolan | 5%. |

This composition exhibited a clearing point of 60.2° C. a viscosity of 29.0 mPa·s, an optical anisotropy of 0.190, a threshold voltage of 1.32 V and a δ of 0.006 V/°C.

As compared with the composition of Comparative examples 1 and 2, this composition exhibited a lower threshold voltage and a reduced characteristic of the threshold voltage.

Example 4

A liquid crystal composition was prepared, which consisted of

| | |
|---|---|
| as compounds expressed by the formula (1), | |
| 3,4,5-trifluorophenyl-4-ethyl benzoate | 9%, |
| 3,4,5-trifluorophenyl-4-(trans-4-propylcyclohexyl)-benzoate | 5%, |
| as compounds expressed by the formula (2), | |
| 3-fluoro-4-cyanophenyl-4-(propyloxymethyl)benzoate | 10%, |
| 3-fluoro-4-cyanophenyl-4-(butyloxymethyl)benzoate | 6%, |
| 3-fluoro-4-cyanophenyl-4-(pentyloxymethyl)benzoate | 5%, |
| 3-fluoro-4-cyanophenyl-4-(trans-3-pentenyl)benzoate | 10%, |
| as a compound expressed by the formula (6), | |
| 4-[trans-4-(methoxymethyl)cyclohexyl]benzonitrile | 5%, |
| as compounds expressed by the formula (8), | |
| 2-(4-ethoxyphenyl)-5-propylpyrimidine | 3%, |
| 2-(4-ethoxyphenyl)-5-butylpyrimidine | 3%, |
| 4-butyloxyphenyl-trans-4-propylcyclohexanecarboxylate | 8%, |
| 4-ethoxyphenyl-trans-4-butylcyclohexanecarboxylate | 6%, |
| 4-methoxyphenyl-trans-4-pentylcyclohexanecarboxylate | 6%, |
| 4-ethoxyphenyl-trans-4-propylcyclohexanecarboxylate | 5%, |
| 4-ethoxyphenyl-trans-4-pentylcyclohexanecarboxylate | 4%, |
| 2-[4-(trans-4-propylcyclohexyl)phenyl]-5-ethylpyrimidine | 3%, |
| 2-[4-(trans-4-propylcyclohexyl)phenyl-5-propylpyrimidine | 3%, |
| 4-[trans-4-(trans-4-propylcyclohexyl)cyclohexyl]toluene | 9%. |

This composition exhibited a clearing point of 47.4° C., a viscosity of 47.0 mPa·s, an optical anisotropy of 0.114, a threshold voltage of 0.78 V and a δ of 0.005 V/°C.

As compared with Comparative examples 1 and 2, this composition exhibited a lower threshold voltage and a reduced temperature characteristic of threshold voltage.

Example 5

A liquid crystal composition was prepared, which consisted of

| | |
|---|---|
| as compounds expressed by the formula (1), | |
| 3,4,5-trifluorophenyl-trans-4-ethylcyclohexane-carboxylate | 10%, |
| 3,4,5-trifluorophenyl-4'-propylbiphenylyl-4-carboxylate | 5%, |
| 3,4,5-trifluorophenyl-trans-4-(trans-4-pentylcyclo-hexyl)cyclohexanecarboxylate | 5%, |
| as compounds expressed by the formula (2), | |
| 3-fluoro-4-cyanophenyl-4-[trans-4-(ethoxymethyl)-cyclohexyl]benzoate | 4%, |
| 3-fluoro-4-cyanophenyl-4-[trans-4-(butyloxymethyl)-cyclohexyl]benzoate | 4%, |
| 3-fluoro-4-cyanophenyl-4-[trans-4-(pentyloxymethyl)-cyclohexyl]benzoate | 4%, |
| as compounds expressed by the formula (4), | |
| 4-[trans-4-(trans-4-ethylcyclohexyl)cyclohexyl]-2-fluorobenzonitrile | 4%, |
| 4-[trans-4-(trans-4-propylcyclohexyl)cyclohexyl]-2-fluorobenzonitrile | 5%, |
| as a compound expressed by the formula (5), | |
| 2-(4-fluorophenyl)-5-pentylpyrimidine | 4%, |
| as compounds expressed by the formula (6), | |
| 4-[trans-4-(3-butenyl)cyclohexyl]benzonitrile | 10%, |
| 4-[trans-4-(trans-3-pentenyl)cyclohexyl]benzonitrile | 10%, |
| as compounds expressed by the formula (8), | |
| 2-(4-ethylphenyl)-5-propylpyrimidine | 3%, |
| 4-[trans-4-(trans-4-propylcyclohexyl)cyclohexyl]toluene | 10%, |
| 4-[trans-4-(trans-4-propylcyclohexyl)cyclohexyl]-1-propylbenzene | 10%, and |
| as compounds expressed by the formula (9), | |
| 4-ethyl-4'-methyltolan | 3%, |
| 4-hexyl-4'-methyltolan | 6%, |
| 4,4'-dibutyltolan | 3%. |

This composition exhibited a clearing point of 71.5° C., a viscosity of 29.5 mPa·s, an optical anisotropy of 0.131, a threshold voltage of 1.32 V and a δ of 0.007 V/°C.

As compared with Comparative examples 1 and 2, this composition exhibited a lower threshold voltage and a lower characteristic of the threshold voltage.

Example 6

A liquid crystal composition was prepared, which consisted of

| | |
|---|---|
| as compounds expressed by the formula (1), | |
| 3,4,5-trifluorophenyl-trans-4-ethylcyclohexanecarboxylate | 5%, |
| 3,4,5-trifluorophenyl-4-ethylbenzoate | 5%, |
| as compounds expressed by the formula (2), | |
| 3-fluoro-4-cyanophenyl-4-(propyloxymethyl)benzoate | 10%, |
| 3-fluoro-4-cyanophenyl-4-(trans-3-pentenyl)benzoate | 6%, |
| as compounds expressed by the formula (4), | |
| 4-[trans-4-(trans-4-ethylcyclohexyl)cyclohexyl]-2-fluorobenzonitrile | 8%, |
| 4-[trans-4-(trans-4-propylcyclohexyl)cyclohexyl]-2-fluorobenzonitrile | 7%, |
| 4-[trans-4-(trans-4-ethylcyclohexyl)cyclohexyl]-benzonitrile | 5%, |
| 4-[trans-4-(trans-4-propylcyclohexyl)cyclohexyl]-benzonitrile | 5%, |
| as a compound expressed by the formula (6), | |
| trans-2-(4-cyanophenyl)-5-propyldioxane | 5%, |
| as a compound expressed by the formula (7), | |
| 4-fluorophenyl-trans-4-butylcyclohexylcarboxylate and | 5%, |
| as compounds expressed by the formula (8), | |
| 4-(trans-4-propylcyclohexyl)-1-ethoxybenzene | 3%, |
| 4-pentylphenyl-4-hexyloxybenzoate | 5%, |
| 4-propylphenyl-trans-4-butylcyclohexanecarboxylate | 5%, |
| 2-(4-ethylbiphenyl-4'-yl)-5-propylpyrimidine | 5%, |
| 2-(4-ethylbiphenyl-4'-yl)-5-butylpyrimidine | 5%, |
| 4-[trans-4-(trans-4-propylcyclohexyl)cyclohexyl]-1-propylbenzene | 16%. |

This composition exhibited a clearing point of 92.2° C. a viscosity of 48.7 mPa·s, an optical anisotropy of 0.133, a threshold voltage of 1.27 V and a δ of 0.005 V/°C. As compared with Comparative examples 1 and 2, the composition exhibited a lower threshold voltage and a reduced temperature characteristic of the threshold voltage.

(Effectiveness of the Invention)

As apparent from Comparative examples and Examples, the liquid crystal composition of the present invention has reduced threshold voltage and temperature-dependency. Hence when this liquid crystal composition is used, it is possible to prepare a liquid crystal display element which effects a low voltage drive, a low power consumption and hardly causes inferior display such as insufficient contrast within a service temperature range, etc.

What we claim is:

1. A liquid crystal composition which comprises as a first component, at least one compound expressed by the formula (1)

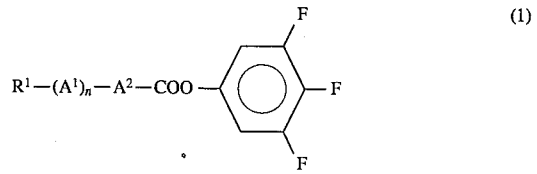

wherein R¹ represents an alkyl group of 1 to 10 carbon atoms and one —CH₂— group or two not-adjacent —CH₂— groups present in the alkyl group may be replaced by oxygen atom, —CO— group, —COO— group or —CH=CH— group; n represents 0 or 1; and A¹ and A² each independently represent trans-1,4-cyclohexylene or 1,4-phenylene, as a second component, at least one compound chosen from a group of compounds expressed by either one of the formulas (2) to (5):

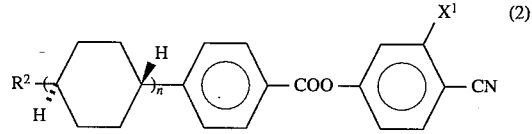

wherein R² represents an alkyl group of 1 to 10 carbon atoms and one —CH₂— group or two not-adjacent —CH₂— groups present in the alkyl group may be replaced by oxygen atom or —CH=CH— group; n represents 0 or 1; and X¹ represents H or F,

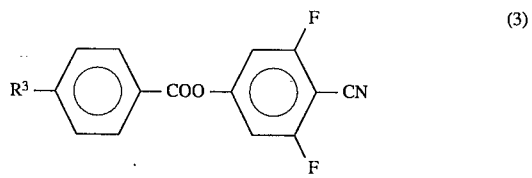

wherein R³ represents a linear alkenyl group of 2 to 10 carbon atoms,

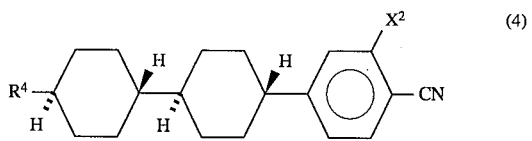

wherein R⁴ represents a linear alkyl group of 1 to 10 carbon atoms; and X² represents H or F, and

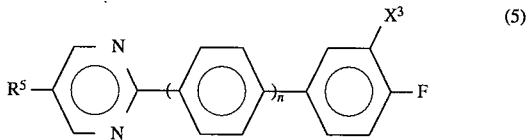

wherein R⁵ represents an alkyl group of 1 to 10 carbon atoms; n represents 0 or 1; and X³ represents H or F, and as a third component, at least one compound chosen from a group of compounds expressed by either one of the formulas (6) to (9):

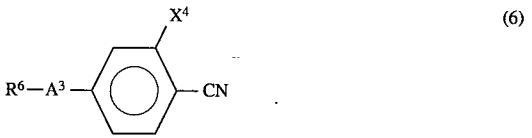

wherein R⁶ represents an alkyl group of 1 to 10 carbon atoms; and one —CH₂— group or two not-adjacent —CH₂— groups may be replaced by oxygen atom or —CH=CH— group; A³ represents trans-1,4-cyclohexylene, 1,4-phenylene or

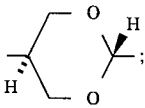

and X⁴ represents H or F,

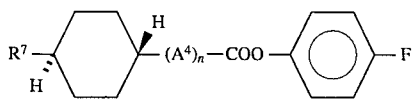 (7)

wherein R⁷ represents a linear alkyl group of 1 to 10 carbon atoms; A⁴ represents trans-1,4-cyclohexylene or 1,4-phenylene; and n represents 0 or 1, $$R^8—A^5—(A^6)_n—Z^1—A^7—R^9 \quad (8)$$

wherein R⁸ and R⁹ each independently represent an alkyl group of 1 to 10 carbon atoms and one —CH₂— group or two not-adjacent —CH₂— groups may be replaced by oxygen atom; A⁵ and A⁶ each independently represent 1,4-cyclohexylene or 1,4-phenylene, n represents 0 or 1; Z¹ represents —COO— or single bond; and A⁷ represents trans-1,4-cyclohexylene, 1,4-phenylene or

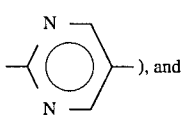 ), and (9)

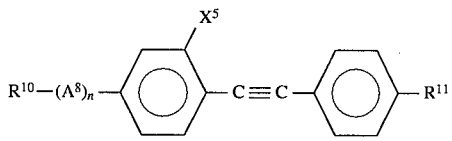

wherein R¹⁰ and R¹¹ each independently represent an alkyl group of 1 to 10 carbon atoms and one —CH₂— group or two not-adjacent —CH₂— groups may be replaced by oxygen atom; n represents 0 or 1; A⁸ represents trans-1,4-cyclohexylene or

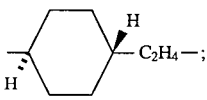

and X⁵ represents H or F.

2. A liquid crystal composition according to claim 1, wherein the proportion of the first component in the composition is 3 to 70% by weight; that of the second component is 3 to 70% by weight; and that of the third component is 3 to 70% by weight.

3. A liquid crystal composition according to claim 1, wherein the compound constituting the first component expressed by the formula (1) is of the formula (1a)

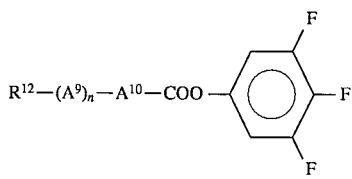 (1a)

wherein R¹² represents a linear alkyl group of 1 to 10 carbon atoms; n represents 0 or 1; and A⁹ and A¹⁰ each independently represent trans-1,4-cyclohexylene or 1,4-phenylene, but when A⁹ represents 1,4-phenylene, A¹⁰ represents 1,4-phenylene.

4. A liquid crystal composition according to claim 1, wherein the compound constituting the second component expressed by the formula (2), is of the following formula (2a), (2b) or (2c):

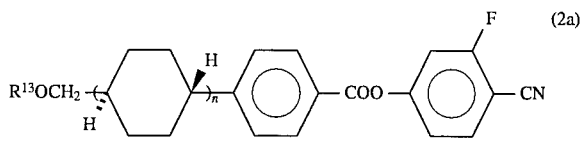 (2a)

wherein R¹³ represents a linear alkyl group of 1 to 10 carbon atoms and n represents 0 or 1,

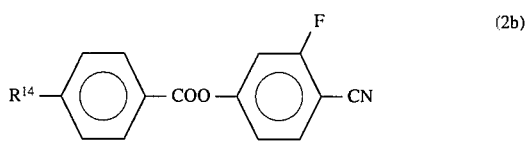 (2b)

wherein R¹⁴ represents a linear alkenyl group of 2 to 14 carbon atoms, and

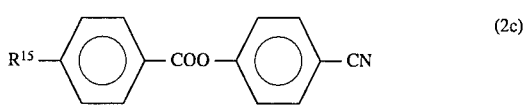 (2c)

wherein R¹⁵ represents a linear alkyl group of 1 to 10 carbon atoms.

5. A liquid crystal composition according to claim 1, wherein the compound expressed by the formula (5) is a compound expressed by the formula (5a)

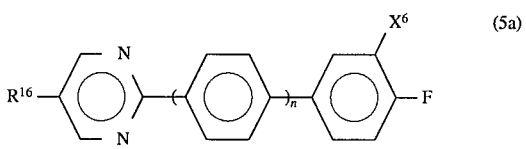 (5a)

wherein R¹⁶ represents a linear alkyl group of 1 to 10 carbon atoms; n represents 0 or 1; and when n is 0, X⁶ represents H or F, and when n is 1, X⁶ represents H.

6. A liquid crystal composition according to claim 1, wherein the compound constituting the third component expressed by the formula (6) is of the following formula (6a) or (6b):

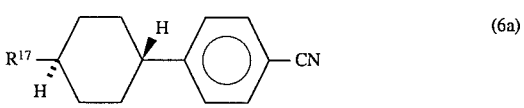 (6a)

wherein R¹⁷ represents an alkoxymethyl group of 2 to 10 carbon atoms or an alkenyl group of 2 to 10 carbon atoms,

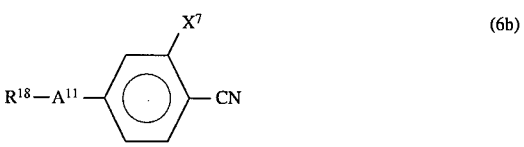 (6b)

wherein R¹⁸ represents a linear alkyl group of 1 to 10 carbon atoms; A¹¹ represents a trans-1,4-cyclohexylene, 1,4-phenylene or

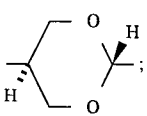

when A¹¹ is trans-1,4-cyclohexylene, X⁷ is H or F, and when A¹¹ is 1,4-phenylene or

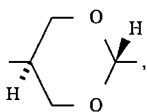

$A^7$ is H.

7. A liquid crystal composition according to either one of claims 1 to 6, wherein the compound constituting the third component expressed by the formula (6) is of the following formula (8a), (8b), (8c) or (8d):

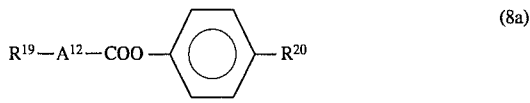

wherein $A^{12}$ represents trans-1,4-cyclohexylene or 1,4-phenylene; when $A^{12}$ is trans-1,4-cyclohexylene, $R^{19}$ represents a linear alkyl group of 1 to 10 carbon atoms and when $A^{12}$ is 1,4-phenylene, $R^{19}$ represents a linear alkoxy group of 1 to 10 carbon atoms; when $A^{12}$ is trans-1,4-cyclohexylene, $R^{20}$ is a linear alkyl group or a linear alkoxy group of 1 to 10 carbon atoms and when $A^{12}$ is trans-1,4-cyclohexylene, $R^{20}$ represents a linear alkyl group or a linear alkoxy group of 1 to 10 carbon atoms, and when $A^{12}$ is 1,4-phenylene, $R^{20}$ is a linear alkyl group of 1 to 10 carbon atoms,

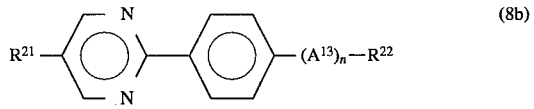

wherein $R^{21}$ represents a linear alkyl group of 1 to 10 carbon atoms; $A^{13}$ represents trans-1,4-cyclohexylene or 1,4-phenylene; n represents 0 or 1; when n is 0, $R^{22}$ is a linear alkyl group or a linear alkoxy group of 1 to 10 carbon atoms and when n is 1, $R^{22}$ is a linear alkyl group of 1 to 10 carbon atoms,

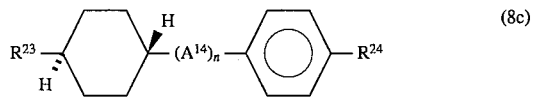

wherein $R^{23}$ represents a linear alkyl group of 1 to 10 carbon atoms; $A^{14}$ represents trans-1,4-cyclohexylene or 1,4-phenylene; n represents 0 or 1; when n is 0, $R^{24}$ is a linear alkoxy group of 1 to 10 carbon atoms, and when n is 1 and $A^{14}$ is trans-1,4-cyclohexylene, $R^{24}$ is a linear alkyl group or a linear alkoxy group of 1 to 10 carbon atoms, and when n is 1 and $A^{14}$ is 1,4-phenylene, $R^{24}$ is a linear alkyl group of 1 to 10 carbon atoms,

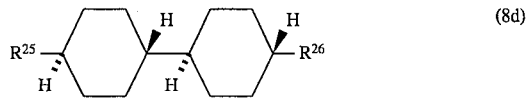

wherein $R^{25}$ represents a linear alkyl group of 1 to 10 carbon atoms; and $R^{26}$ represents a linear alkyl group of 1 to 10 carbon atoms or a linear alkoxy group of 2 to 10 carbon atoms.

8. A liquid crystal composition according to claim 1, wherein the compound constituting the third component expressed by the formula (9) is of the following formula (9a) or (9b):

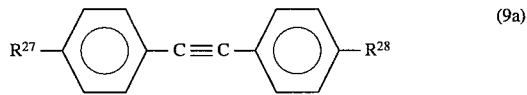

wherein $R^{27}$ represents a linear alkyl group of 1 to 10 carbon atoms; and $R^{28}$ represents a linear alkyl group or a linear alkoxy group of 1 to 10 carbon atoms,

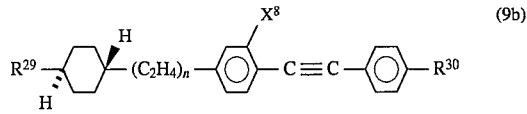

wherein $R^{29}$ and $R^{30}$ each independently represents a linear alkyl group of 1 to 10 carbon atoms; n represents 0 or 1; when n is 0, $X^8$ is F, and when n is 1, $X^8$ is H.

9. An electrooptical display element containing a liquid crystal composition according to any one of claims 1 to 6.

10. An electrooptical display element containing a liquid crystal composition according to claim 7.

11. An electrooptical display element containing a liquid crystal composition according to claim 8.

* * * * *